(12) United States Patent
Kim (10) Patent No.: US 8,742,634 B2
(45) Date of Patent: Jun. 3, 2014

(54) LINEAR VIBRATION MOTOR

(75) Inventor: Yong Jin Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 209 days.

(21) Appl. No.: 13/326,154

(22) Filed: Dec. 14, 2011

(65) Prior Publication Data

US 2013/0049491 A1 Feb. 28, 2013

(30) Foreign Application Priority Data

Aug. 23, 2011 (KR) .................. 10-2011-0084177

(51) Int. Cl.
 *H02K 33/00* (2006.01)
 *H02K 33/16* (2006.01)
(52) U.S. Cl.
 USPC ............... 310/25; 310/12.16; 310/81; 310/28
(58) Field of Classification Search
 USPC ................. 310/12.16, 15–36, 81; 340/407.01
 See application file for complete search history.

(56) References Cited

U.S. PATENT DOCUMENTS

| 5,973,422 A * | 10/1999 | Clamme | 310/36 |
| 2009/0136075 A1* | 5/2009 | Meyer | 381/386 |

FOREIGN PATENT DOCUMENTS

| KR | 2009-0066538 | * 10/2009 |
| KR | 10-2011-0008534 | 1/2011 |
| KR | 10-1046044 B1 | 7/2011 |

OTHER PUBLICATIONS

KR 2009-0066538 machine translation Sep. 7, 2013.*
Office Action dated Sep. 25, 2012 for related KR App. No. 10-2011-0084177 and its English summary.

* cited by examiner

*Primary Examiner* — Tran Nguyen
*Assistant Examiner* — Leda Pham
(74) *Attorney, Agent, or Firm* — Ladas & Parry, LLP (57) ABSTRACT

Disclosed herein is a linear vibration motor including: a stator part including a magnetic force part and a casing receiving the magnetic force part therein; and a vibrator part including a coil facing the magnetic force part to thereby generate electromagnetic force and a printed circuit board having one end coupled to the stator part and the other end coupled to the coil, wherein the vibrator part moves linearly along a longitudinal outer peripheral surface of the casing receiving the magnetic force part therein.

20 Claims, 6 Drawing Sheets

LINEAR VIBRATION MOTOR

CROSS REFERENCE TO RELATED APPLICATION

This application claims the benefit of Korean Patent Application No. 10-2011-0084177, filed on Aug. 23, 2011, entitled "Linear Vibration Motor", which is hereby incorporated by reference in its entirety into this application.

BACKGROUND OF THE INVENTION

1. Technical Field

The present invention relates to a linear vibration motor.

2. Description of the Related Art

A general vibration motor, which is a component converting an electrical energy into mechanical vibration using a principle of generating electromagnetic force, is mounted in a mobile communication terminal, a portable terminal, and the like, to be used for silently notifying a user of call reception.

Currently, a linear vibration motor has been generally used as the vibration motor. The linear vibration motor is generally disposed at an edge portion of a device and generates vibration in a direction perpendicular to an object receiving the vibration.

In recent years, as the release of a mobile phone having a large liquid crystal display (LCD) screen has rapidly increased, a touch screen scheme has been adopted, such that a vibrating motor has been used in order to generate vibrations at the time of touch of the LCD screen. Performance particularly required in the vibration at the time of the touch in the touch screen is as follows. First, as the number of vibration generation at the time of the touch becomes larger than that of vibration generation at the time of call reception, an operation lifespan time needs to increase. Second, in order to raise user's satisfaction when a user feels the vibration at the time of the touch, a response speed of the vibration needs to increase in accordance with a touch speed of the screen.

The linear vibration motor according to the prior art includes a plurality of magnets mounted in a stator part. However, since the plurality of magnets are coupled to an inner portion of the stator part by a bonding adhesion scheme, there is a difficulty in that it is required to accurately apply an accurate amount of adhesive at the time of manufacturing of the linear vibration motor.

In addition, there is a difficulty in securing accurate concentricity since the plurality of magnets are out of the center of an inner portion of the linear vibration motor during a process of curing the adhesive.

Further, in order to accurately apply the accurate amount of adhesive, additional processes and process devices are required, such that a manufacturing cost increases.

Furthermore, when adhesion of the adhesive is reduced due to driving of the linear vibration motor for a long period of time or external impact is applied to the linear vibration motor, the plurality of magnets are separated from the stator part to contact the vibrator part, thereby causing a malfunction and a damage in the linear vibration motor.

SUMMARY OF THE INVENTION

The present invention has been made in an effort to provide a linear vibration motor including a separate casing receiving a magnetic force part configured of a plurality of magnets therein.

According to a preferred embodiment of the present invention, there is provided a linear vibration motor including: a stator part including a magnetic force part and a casing receiving the magnetic force part therein; and a vibrator part including a coil facing the magnetic force part to thereby generate electromagnetic force and a printed circuit board having one end coupled to the stator part and the other end coupled to the coil, wherein the vibrator part moves linearly along a longitudinal outer peripheral surface of the casing receiving the magnetic force part therein.

The magnetic force part may be configured of a single magnet.

The magnetic force part may be configured of a plurality of magnets.

The magnetic force part may include: a first magnet; and a second magnet selectively coupled to at least any one of upper and lower surfaces of the first magnet.

The magnetic force part may further include a plate yoke coupled between the first and second magnets.

The stator part may further include: a case having an inner space formed therein so as to cover the vibrator part; and a bracket coupled to a lower portion of the case, the casing may include a reception part extended downwardly from the center of an upper surface of the case and including an opening part formed in an upward direction and include an outer peripheral surface and a lower portion that are closed, and the magnetic force part may be fixedly stacked in the casing.

The casing may further include a cover member shielding the opening part formed in the upward direction.

The bracket may include a fixing holder protruded from an upper surface of an inner side thereof, wherein the fixing holder fixes the low portion of the casing.

The stator part may further include: a case damper mounted on an upper surface of an inner side of the case to thereby prevent noise and impact at the time of contact between the case and the vibrator part; and a bracket damper mounted on an upper surface of an inner side of the bracket to thereby prevent noise and impact at the time of contact between the bracket and the vibrator part.

The stator part may further include: a case having an inner space formed therein so as to cover the vibrator part; and a bracket coupled to a lower portion of the case, the casing may include a reception part extended upwardly from the center of an upper surface of the bracket and including an opening part formed in a downward direction and include an outer peripheral surface and a lower portion that are closed, and the magnetic force part may be fixedly stacked in the casing.

The casing may further include a cover member shielding the opening part formed in the downward direction.

The case may include a fixing holder protruded from an upper surface of an inner side thereof, wherein the fixing holder fixes the upper portion of the casing.

The stator part may further include: a case damper mounted on an upper surface of an inner side of the case to thereby prevent noise and impact at the time of contact between the case and the vibrator part; and a bracket damper mounted on an upper surface of an inner side of the bracket to thereby prevent noise and impact at the time of contact between the bracket and the vibrator part.

The printed circuit board may include: a coupling plate fixedly coupled to the stator part; an elastic part extended from the coupling plate in a spiral direction so as to have elastic force; and a contact part provided at one end of the elastic part and coupled to the coil of the vibrator part to thereby apply external power to the coil.

The vibrator part may include: a cylindrical yoke coupled to an outer peripheral surface of the coil and having an upper portion coupled to a lower end portion of an elastic member; a weight body provided with a hollow hole receiving the cylindrical yoke and the coil therein to thereby be coupled to an outer peripheral surface of the cylindrical yoke; and the elastic member having an upper end portion coupled to an upper surface of an inner side of the stator part and the lower end portion coupled to an upper portion of the vibrator part to thereby elastically support linear movement of the vibrator part, and the coil may be coupled to the other end of the printed circuit board.

DESCRIPTION OF THE PREFERRED EMBODIMENTS

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 1:
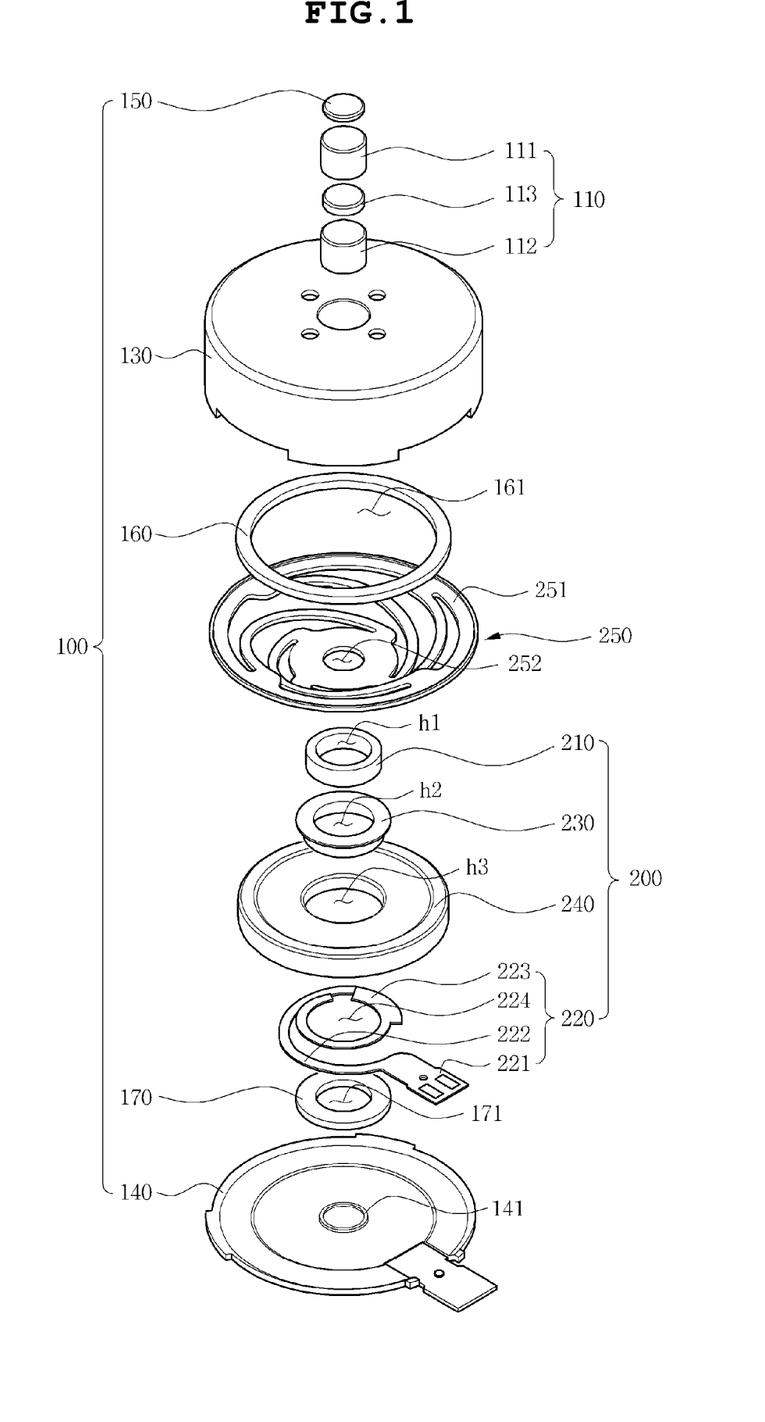
FIG. 1 is an exploded perspective view of a linear vibration motor according to a first preferred embodiment of the present invention.
Figure 2A:
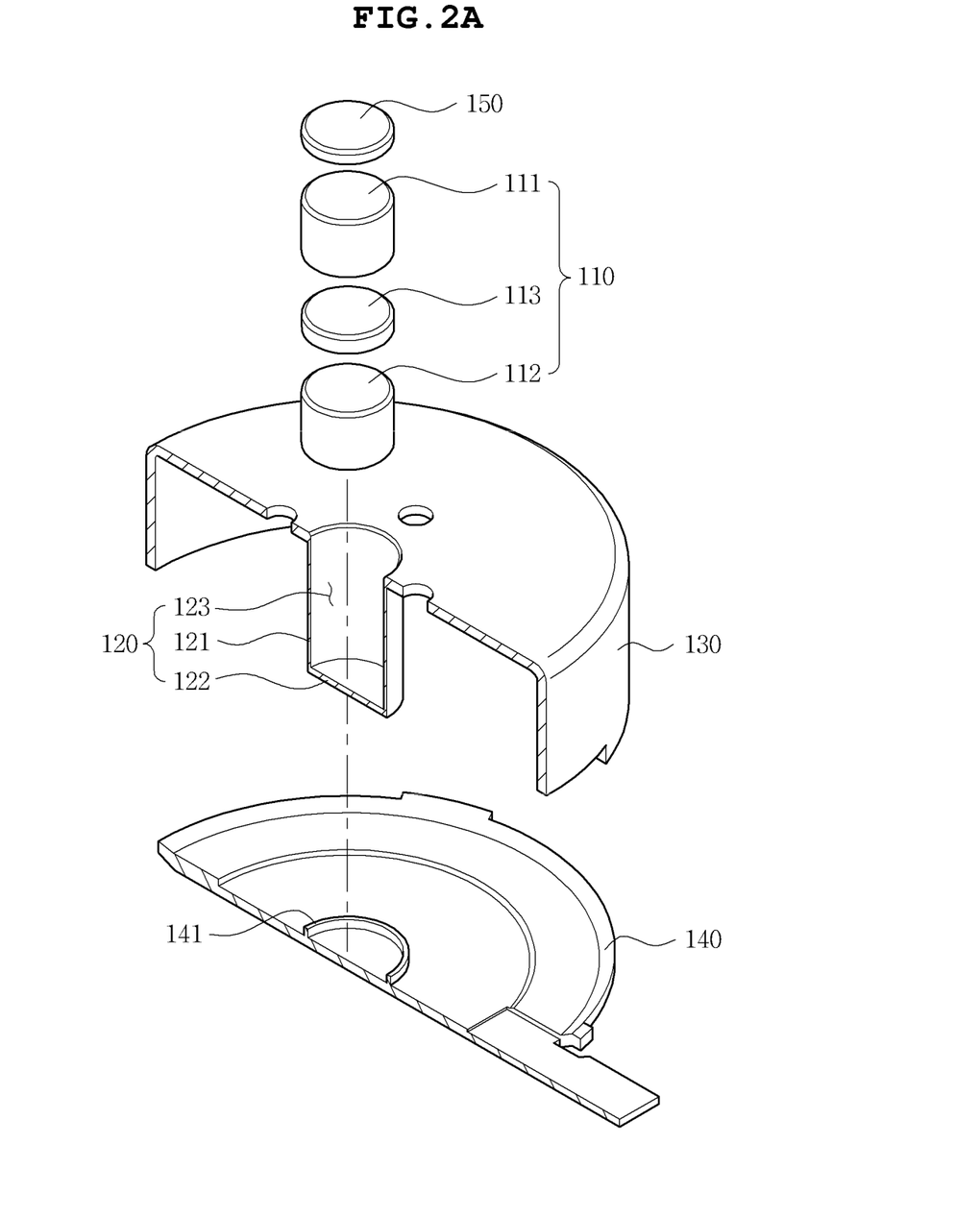
FIG. 2A is a schematic exploded perspective view of a stator part shown in FIG. 1.
Figure 2B:
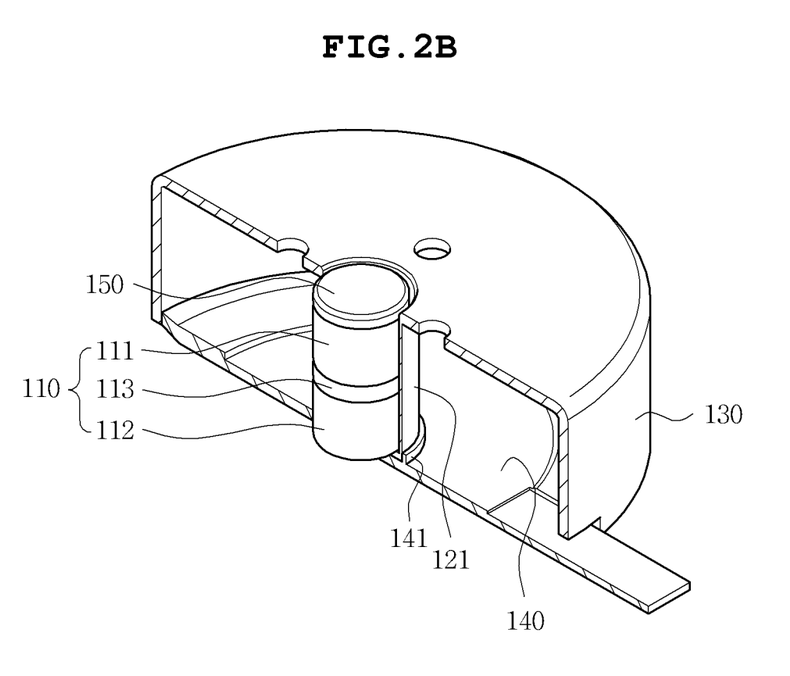
FIG. 2B is a cross-sectional view schematically showing an assembled state of the stator part shown in FIG. 1.
Figure 4:
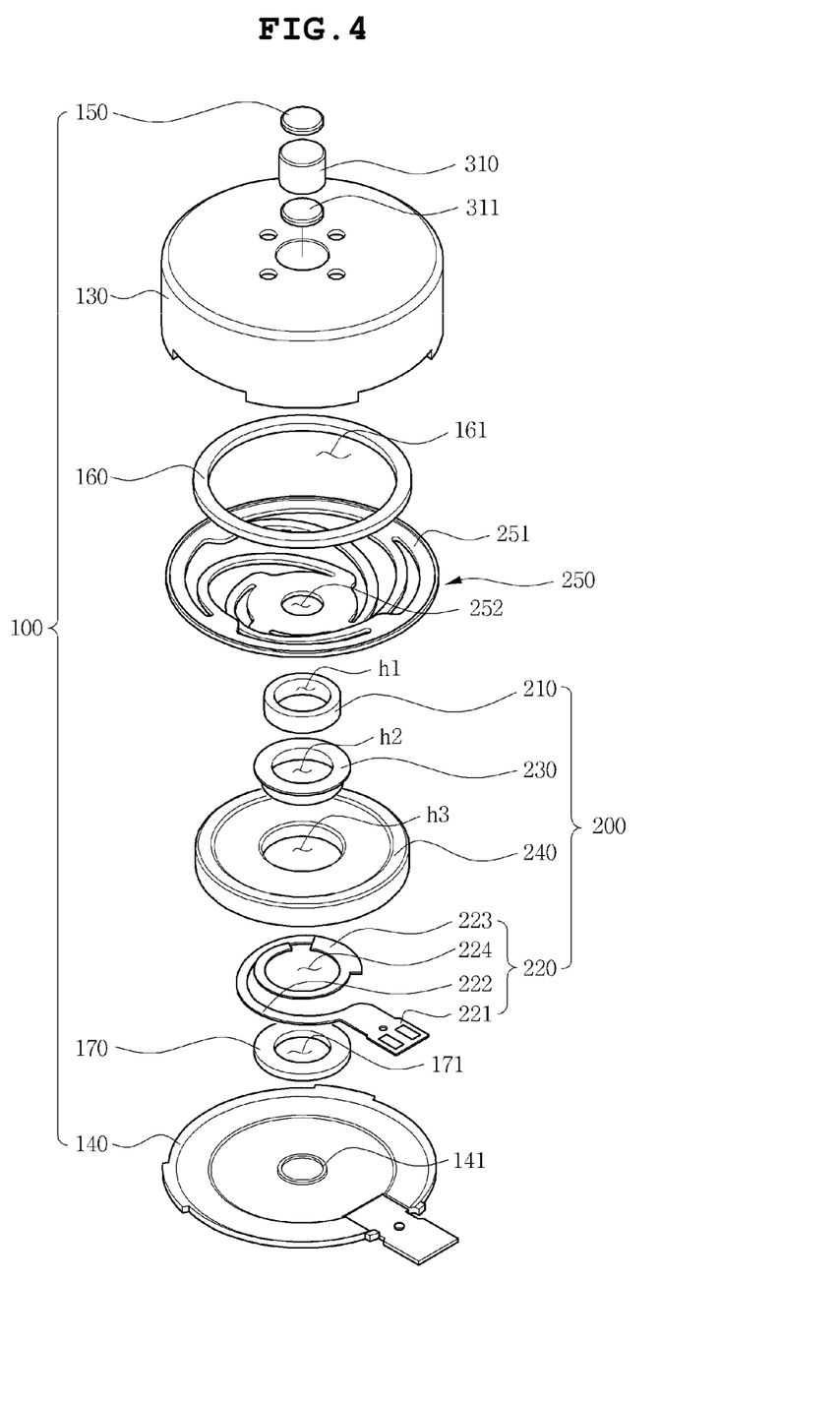
FIG. 4 is an exploded perspective view of a linear vibration motor according to another preferred embodiment of a magnetic force part configuring the present invention.

FIG. 1 is an exploded perspective view of a linear vibration motor according to a first preferred embodiment of the present invention; FIG. 2A is a schematic exploded perspective view of a stator part shown in FIG. 1; FIG. 2B is a cross-sectional view schematically showing an assembled state of the stator part shown in FIG. 1; and FIG. 4 is an exploded perspective view of a linear vibration motor according to another preferred embodiment of a magnetic force part configuring the present invention. As shown, the linear vibration motor includes a stator part 100 and a vibrator part 200.

As shown in FIGS. 1 and 4, according to the first preferred embodiment of the present invention, the stator part 100 includes a magnetic force part 110 or 310, a casing 120 receiving the magnetic force part 110 or 310 therein, a case 130, and a bracket 140.

More specifically, the magnetic force part 110 or 310 may be configured of a single magnet as shown in FIG. 4 or be configured of at least two magnets as shown in FIG. 1.

In addition, the single magnet configuring the magnetic force part 310 may include a plate yoke 311 coupled to a lower portion thereof.

That is, as shown in FIGS. 1 to 2B, the magnetic force part 110 is configured of first and second magnets 111 and 112.

However, in the number of magnets configuring the magnetic force part, configurations of a single magnet and at least two magnets will also be included in the preferred embodiment of the present invention.

In addition, according to the first preferred embodiment of the present invention, the first and second magnets 111 and 112 may include a plate yoke 113 coupled therebetween.

Further, the case 130 has an inner space formed therein so as to cover the vibrator part 200.

In addition, as shown in FIG. 2a, the casing 120 includes a reception part 123 extended downwardly from the center of an upper surface of the case 130 toward the bracket 140.

More specifically, the casing 120 has a structure in which an opening part is formed in an upward direction, that is, in an upper portion thereof toward an outside of the case 130 and an outer peripheral surface 121 and a lower portion 122 thereof are closed, as shown.

Therefore, the casing 120 may have a cylinder shape in which the upper portion thereof is opened and the outer peripheral surface 121 and the lower portion 122 thereof are closed, in accordance to a shape of the magnetic force part 110.

In addition, the casing 120 includes a cover member 150 for covering the opening part formed in the upward direction of the case 130.

Further, the bracket 140 is coupled to a lower portion of the case 130 and includes a fixing holder 141 protruded from an upper surface of an inner side thereof, wherein the fixing holder 141 fixes the low portion of the casing 120.

More specifically, the fixing holder 141 may have an inner diameter slightly larger than an outer diameter of the casing 120 having the cylinder shape so that the lower portion 122 of the casing 120 may be press-fitted into the fixing holder 141 to thereby be fixed to the bracket 140.

In order to increase coupling force between the casing 120 and the fixing holder 141, an adhesive may be applied to a coupling surface between the lower portion 122 of the casing 120 and the fixing holder 141.

Therefore, as shown in FIG. 2B, the first and second magnets 111 and 112 and the plate yoke 113 that configure the magnetic force part 110 is fixedly stacked in the reception part 123 of the casing 120.

In addition, the cover member 150 is fixedly coupled to an upper surface of the first magnet 111 in order to shield the opening part formed in the upward direction of the casing 120.

In addition, the case 130 includes a case damper 160 mounted on an upper surface of an inner side thereof in order to prevent noise and impact due to the contact between the case 130 and the vibrator part 200.

In addition, the bracket 140 includes a bracket damper 170 mounted on an upper surface of an inner side thereof in order to prevent noise and impact due to the contact between the bracket 140 and the vibrator part 200.

As shown in FIG. 1, the vibrator part 200 according to the preferred embodiment of the present invention includes a coil 210, a printed circuit board 220, a cylindrical yoke 230, a weight body 240, and an elastic member 250.

In addition, the coil 210 receives the magnetic force part 110 therein so as to be insertable into a hollow hole h1 thereof.

More specifically, the coil 210 may have an annular shape in which it includes the hollow hole h1 having an inner diameter larger than an outer diameter of the reception part 123 receiving the magnetic force part 110 therein in order to move linearly along a longitudinal outer peripheral surface of the magnetic force part 110.

In addition, the coil 210 is coupled to the other end of the printed circuit board 220 to thereby receive power from the outside.

The cylindrical yoke 230 is coupled to an outer peripheral surface of the coil 210 and has an upper portion coupled to a lower portion of the elastic member 250.

In addition, the cylindrical yoke 230 is provided with a hollow hole h2 corresponding to the hollow hole h1 of the coil 210 to thereby receive the reception part 123 therein so as to be insertable into the hollow hole h2, wherein the reception part 123 receives the magnetic force part 110 therein.

Further, the weight body 240 is provided with a hollow hole h3 receiving the cylindrical yoke 230 therein to thereby be coupled to an outer peripheral surface of the cylindrical yoke 230, wherein the cylindrical yoke 230 is coupled integrally to the coil 210.

Therefore, each of the coil 210, the cylindrical yoke 230, and the weight body 240 that configure the vibrator part 200 is provided with the hollow holes h1, h2, and h3 for receiving the reception part 123 therein, such that it moves linearly along the longitudinal outer peripheral surface of the magnetic force part 110, wherein the reception part 123 receives the magnetic force part 110 therein.

In addition, as shown in FIG. 1, the elastic member 250 has an upper end portion 251 coupled to the stator part 100 and a lower end portion coupled to an upper portion of the vibrator part 200.

More specifically, the elastic member 250 has the upper end portion 251 coupled to an upper surface of an inner side of the case 130 and the lower end portion coupled to an upper portion of the cylindrical yoke 230 to thereby elastically support linear movement of the vibrator part 200.

In addition, the elastic member 250 is provided with a hollow part 252 having an inner diameter larger than an outer diameter of the reception part 123 in which the magnetic force part 110 is received.

Therefore, the elastic member 250 elastically supports the linear movement of the vibrator part 200, such that it moves linearly along the longitudinal outer peripheral surface of the magnetic force part 110.

As shown in FIGS. 2A and 2B, the magnetic force part 110 is received integrally with the casing 120 therein, such that the magnetic force part 110 is accurately fixedly mounted in the inner portion of the linear vibration motor. Therefore, an assembling deviation does not occur, such that concentricity is secured.

Therefore, it is possible to prevent contact between the inner diameter of the elastic member 250 elastically supporting the vibrator part 200 that vertically moves linearly and the magnetic force part 110 and damage due to the contact.

In addition, since the magnetic force part 110 is received in the casing 120, it does not contact the inner diameter of the coil 210 that vertically moves linearly, thereby making it possible to prevent damage due to the short-circuit and the contact between the coil 210 and the magnetic force part 110.

Figure 3A:
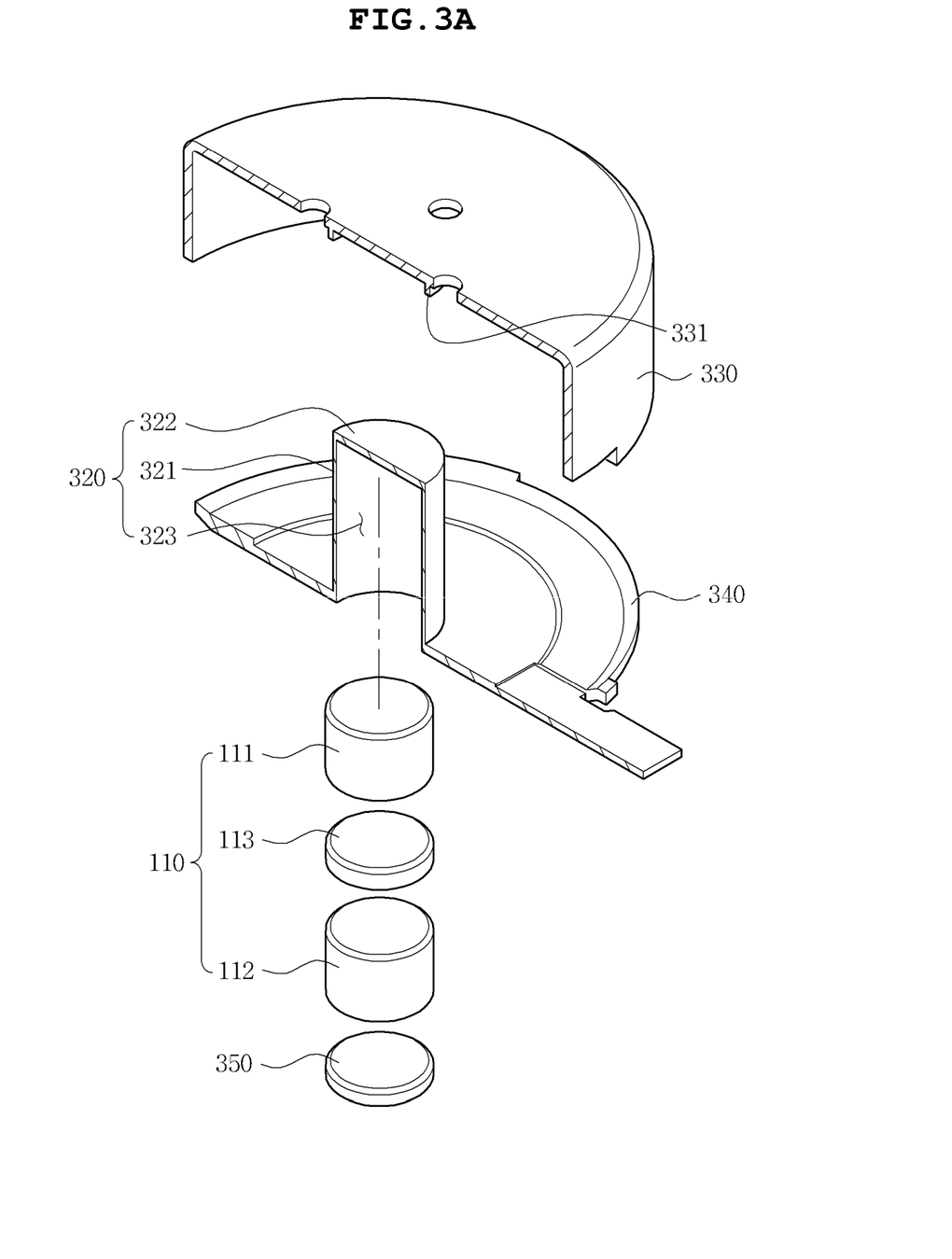
FIG. 3A is a schematic exploded perspective view of a stator part according to a second preferred embodiment of the present invention.
Figure 3B:
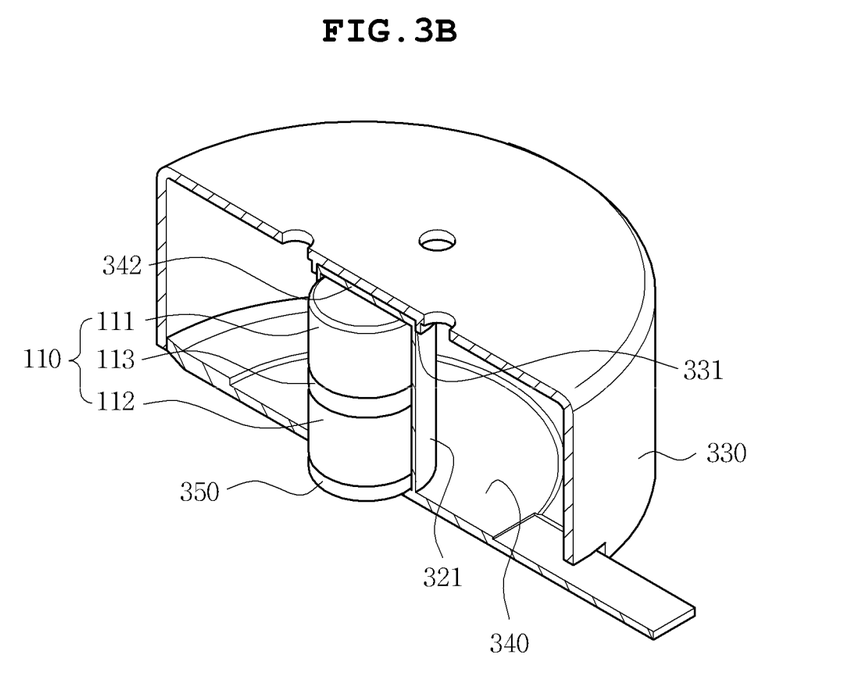
FIG. 3B is a cross-sectional view schematically showing an assembled state of the stator part shown in FIG. 3A.

FIG. 3A is a schematic exploded perspective view of a stator part according to a second preferred embodiment of the present invention; and FIG. 3B is a cross-sectional view schematically showing an assembled state of the stator part shown in FIG. 3A. In describing the present embodiment, the same or corresponding components to the foregoing preferred embodiments are denoted by the same reference numerals and therefore, the description of the overlapping portions will be omitted. Hereinafter, the linear vibration motor according to the present embodiment will be described with reference to FIGS. 3A and 3B.

As shown, a stator part 100 includes a magnetic force part 110, a casing 320 receiving the magnetic force part 110 therein, a case 330, and a bracket 340.

More specifically, the case 330 has an inner space formed therein so as to cover the vibrator part 200.

In addition, as shown in FIG. 3A, the casing 320 includes a reception part 323 extended upwardly from the center of an upper surface of the bracket 340 toward the case 330.

Further, the casing 320 has a structure in which an opening part is formed in a downward direction, that is, in a lower portion thereof toward an outside of the bracket 340 and an outer peripheral surface 321 and an upper portion 322 thereof are close, as shown.

Therefore, the casing 320 may have a cylinder shape in which the lower portion thereof is opened and the outer peripheral surface 321 and the upper portion 322 are closed, in accordance to a shape of the magnetic force part 110.

Further, the bracket 340 is coupled to a lower portion of the case 330, and the case 330 includes a fixing holder 331 protruded from an upper surface of an inner side thereof, wherein the fixing holder 331 fixes the upper portion 322 of the casing 320.

More specifically, the fixing holder 331 may have an inner diameter slightly larger than an outer diameter of the casing 320 so that the upper portion 322 of the casing 320 may be press-fitted into the fixing holder 331 to thereby be fixed to the case 330.

In order to increase coupling force between the casing 320 and the fixing holder 331, an adhesive may be applied to a coupling surface between the casing 320 and the fixing holder 331.

Therefore, as shown in FIG. 4B, the first and second magnets 111 and 112 and the plate yoke 113 that configure the magnetic force part 110 is stacked in the casing 320.

In addition, the cover member 350 is fixedly coupled to a lower surface of the second magnet 112 in order to shield the opening part of the casing 320.

The linear vibration motor according to the preferred embodiment of the present invention includes the casing receiving the magnetic force part configured of a plurality of magnets therein to accurately position the magnetic force part configured of the plurality of magnets at the center of an inner portion of the linear vibration motor, thereby making it possible to secure concentricity.

In addition, it is possible to prevent the linear vibration motor from being damaged due to the contact between the magnet and the vibrator part caused by driving of the linear vibration motor for a long period of time or external impact.

Although the preferred embodiments of the present invention have been disclosed for illustrative purposes, they are for specifically explaining the present invention and thus a linear vibration motor according to the present invention is not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:
1. A linear vibration motor comprising:
 a stator part including a magnetic force part and a casing receiving the magnetic force part therein; and a vibrator part moving linearly along a longitudinal outer peripheral surface of the casing receiving the magnetic force part therein, and including a coil facing the magnetic force part to thereby generate electromagnetic force and a printed circuit board having one end coupled to the stator part and the other end coupled to the coil, wherein the stator part includes a case having an inner space formed therein so as to cover the vibrator part, and a bracket coupled to a lower portion of the case, the casing includes a reception part extended downwardly from the center of an upper surface of the case and including an opening part formed in an upward direction and includes an outer peripheral surface and a lower portion that are closed, and the magnetic force part is fixedly stacked in the casing.

2. The linear vibration motor as set forth in claim 1, wherein the magnetic force part is configured of a single magnet.

3. The linear vibration motor as set forth in claim 1, wherein the magnetic force part is configured of a plurality of magnets.

4. The linear vibration motor as set forth in claim 3, wherein the magnetic force part includes: a first magnet; and a second magnet selectively coupled to at least any one of upper and lower surfaces of the first magnet.

5. The linear vibration motor as set forth in claim 4, wherein the magnetic force part further includes a plate yoke coupled between the first and second magnets.

6. The linear vibration motor as set forth in claim 1, wherein the casing further includes a cover member shielding the opening part formed in the upward direction.

7. The linear vibration motor as set forth in claim 1, wherein the bracket includes a fixing holder protruded from an upper surface of an inner side thereof, the fixing holder fixing the low portion of the casing.

8. The linear vibration motor as set forth in claim 1, wherein the stator part further includes:
a case damper mounted on an upper surface of an inner side of the case to thereby prevent noise and impact at the time of contact between the case and the vibrator part; and
a bracket damper mounted on an upper surface of an inner side of the bracket to thereby prevent noise and impact at the time of contact between the bracket and the vibrator part.

9. The linear vibration motor as set forth in claim 1, wherein the printed circuit board includes:
a coupling plate fixedly coupled to the stator part;
an elastic part extended from the coupling plate in a spiral direction so as to have elastic force; and
a contact part provided at one end of the elastic part and coupled to the coil of the vibrator part to thereby apply external power to the coil.

10. The linear vibration motor as set forth in claim 1, wherein the vibrator part includes:
a cylindrical yoke coupled to an outer peripheral surface of the coil and having an upper portion coupled to a lower end portion of an elastic member;
a weight body provided with a hollow hole receiving the cylindrical yoke and the coil therein to thereby be coupled to an outer peripheral surface of the cylindrical yoke; and
the elastic member having an upper end portion coupled to an upper surface of an inner side of the stator part and the lower end portion coupled to an upper portion of the vibrator part to thereby elastically support linear movement of the vibrator part, and wherein the coil is coupled to the other end of the printed circuit board.

11. A linear vibration motor comprising:
a stator part including a magnetic force part and a casing receiving the magnetic force part therein; and
a vibrator part moving linearly along a longitudinal outer peripheral surface of the casing receiving the magnetic force part therein, and including a coil facing the magnetic force part to thereby generate electromagnetic force and a printed circuit board having one end coupled to the stator part and the other end coupled to the coil,
wherein the stator part further includes a case having an inner space formed therein so as to cover the vibrator part, and a bracket coupled to a lower portion of the case,
the casing includes a reception part extended upwardly from the center of an upper surface of the bracket and including an opening part formed in a downward direction and includes an outer peripheral surface and a lower portion that are closed, and
the magnetic force part is fixedly stacked in the casing.

12. The linear vibration motor as set forth in claim 11, wherein the magnetic force part is configured of a single magnet.

13. The linear vibration motor as set forth in claim 11, wherein the magnetic force part is configured of a plurality of magnets.

14. The linear vibration motor as set forth in claim 13, wherein the magnetic force part includes:
a first magnet; and
a second magnet selectively coupled to at least any one of upper and lower surfaces of the first magnet.

15. The linear vibration motor as set forth in claim 14, wherein the magnetic force part further includes a plate yoke coupled between the first and second magnets.

16. The linear vibration motor as set forth in claim 11, wherein the casing further includes a cover member shielding the opening part formed in the downward direction.

17. The linear vibration motor as set forth in claim 11, wherein the case includes a fixing holder protruded from an upper surface of an inner side thereof, the fixing holder fixing the upper portion of the casing.

18. The linear vibration motor as set forth in claim 11, wherein the stator part further includes:
a case damper mounted on an upper surface of an inner side of the case to thereby prevent noise and impact at the time of contact between the case and the vibrator part; and
a bracket damper mounted on an upper surface of an inner side of the bracket to thereby prevent noise and impact at the time of contact between the bracket and the vibrator part.

19. The linear vibration motor as set forth in claim 11, wherein the printed circuit board includes:
a coupling plate fixedly coupled to the stator part;
an elastic part extended from the coupling plate in a spiral direction so as to have elastic force; and
a contact part provided at one end of the elastic part and coupled to the coil of the vibrator part to thereby apply external power to the coil.

20. The linear vibration motor as set forth in claim 11, wherein the vibrator part includes:
a cylindrical yoke coupled to an outer peripheral surface of the coil and having an upper portion coupled to a lower end portion of an elastic member;

a weight body provided with a hollow hole receiving the cylindrical yoke and the coil therein to thereby be coupled to an outer peripheral surface of the cylindrical yoke; and the elastic member having an upper end portion coupled to an upper surface of an inner side of the stator part and the lower end portion coupled to an upper portion of the vibrator part to thereby elastically support linear movement of the vibrator part, and wherein the coil is coupled to the other end of the printed circuit board.

* * * * *